United States Patent [19]

Krapcho

[11] 3,862,328
[45] Jan. 21, 1975

[54] SALTS OF 1-[0-[(3-DIMETHYLAMINOPROPYL)-THIO]PHENY]-3-METHYLUREA WITH COMPLEX ORGANIC ACIDS

[75] Inventor: John Krapcho, Somerset, N.J.

[73] Assignee: E. R.. Squibb & Sons, Inc., Princeton, N.J.

[22] Filed: Jan. 25, 1972

[21] Appl. No.: 220,700

Related U.S. Application Data

[63] Continuation-in-part of Ser. No. 46,520, June 15, 1970, abandoned, which is a continuation-in-part of Ser. No. 760,072, Sept. 16, 1968, abandoned.

[52] U.S. Cl.................. 424/315, 424/316, 424/317
[51] Int. Cl............................................ A61k 27/00

[58] Field of Search...................... 424/317, 316, 315

[56] References Cited
UNITED STATES PATENTS
3,326,663   6/1967   Soloway................................ 71/2.6

Primary Examiner—Albert T. Meyers
Assistant Examiner—Daren M. Stephens
Attorney, Agent, or Firm—Lawrence S. Levinson; Merle J. Smith

[57] ABSTRACT

Organic acid salts of 1-[o-[(3-dimethylaminopropyl)thio]phenyl]-3-methylurea have been found to have unique ability to relieve cardiac arrhythmias.

7 Claims, No Drawings

SALTS OF 1-[0-[(3-DIMETHYLAMINOPROPYL)-THIO]-PHENY[-3-METHYLUREA WITH COMPLEX ORGANIC ACIDS

DETAILED DESCRIPTION OF THE INVENTION

This invention relates to organic acid salts of 1-[o-[(3-dimethylaminopropyl)thio]phenyl]-3-methylurea]. Salts of this base with complex organic acids have been found to have activity in suppressing cardiac arrhythmias. The same activity has not been evidenced in the base itself, which is included generically in a large group of compounds disclosed as herbicides in U.S. Pat. No. 3,326,663, issued June 20, 1967. The contrast has even been found in the case of inorganic acid salts like hydrochloride.

The salts of 1-[o-[(3-dimethylaminopropyl)thio]-phenyl]-3-methylurea which show this desirable antiarrhythmic activity are pharmaceutically acceptable salts of that base with complex organic acids. These acids are carboxylic acids or sulfonic acids having a cyclic nucleus, i.e.,

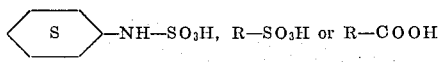

wherein R is a substituted or unsubstituted cyclic nucleus, including phenyl and naphthyl. The substituents on the cyclic nucleus represented by R include lower alkyl, especially methyl, amino and lower alkanoylamido, especially acetamido. Cyclohexanesulfamic acid, toluenesulfonic acid, napthalensulfonic acid, aminobenzoic acid and acetamidobenzoic acid salts are preferred embodiments, especially the first two.

The organic acid salts described above are useful in the relief or suppression of ventricular arrhythmias in animal species when administered orally or parenterally in a dosage of about 5 to 40 mg/kg per day as demonstrated in infarction-induced ventricular arrhythmias in dogs and in thevetin-induced arrhythmias in dogs. They may be used in a manner similar to Pronestyl. In contrast to current compounds used in therapy, like lidocaine, these organic acid salts do not show evidence of toxicity close to the effective dose and they may be used prophylactically.

The pharmaceutically acceptable organic acid salts described above may be administered in a dosage indicated above by incorporating the salt in a pharmaceutically acceptable carrier therefor, e.g., in an oral dosage form such as a tablet or capsule along with conventional carrier, excipient, lubricant or the like according to accepted pharmaceutical practice, or in a parenteral dosage form, such as for intravenous use, including the organic acid salt in a sterile aqueous vehicle along with any necessary stabilizers, preservatives, buffers or the like. Up to about 500 mg. of salt per unit of dosage, e.g., per tablet or ml. of vehicle, preferably 250 to 500 mg. per dosage unit, may be formulated.

The base, 1-[o-[(3-dimethylaminopropyl)thio]-phenyl]-3-methylurea, is produced by reacting o-[(3-dimethylaminopropyl)thio]-aniline with methyl isocyanate in an organic solvent such as acetonitrile at a temperature below about 40°C., then separating the product, all as described in Example 1 below. The organic acid salt is produced by reacting this base with the appropriate complex organic acid, preferably in a warm solution of organic acid in an organic solvent such as ethanol, acetonitrile or the like, then isolating the product, e.g., by recrystallization, as more fully described in the examples.

The following examples are illustrative of the invention. All temperatures are on the centigrade scale.

EXAMPLE 1

1-[o-[(3-Dimethylaminopropyl)thio]phenyl]-3-methylurea

A solution of 372.5 g. of o-[(3-dimethylaminopropyl)thio]aniline in 1 l. of acetonitrile is stirred and treated rapidly with 124 g. of methyl isocyanate while maintaining the temperature below 40°. After stirring for 3 hours at room temperature, the mixture is refluxed for 1 hour and cooled overnight. The colorless crystalline product, 1-[o-[(3-dimethylaminopropyl)thio]phenyl]-3-methylurea, weighs 404 g.; m.p. 101°–103°.

EXAMPLE 2

1-[o-[(3-Dimethylaminopropyl)thio]phenyl]-3-methylurea, cyclohexanesulfamate

A mixture of 2.67 g. of product from Example 1 and 10 ml. of ethanol is warmed to dissolve the solid, cooled to room temperature and treated with a solution of 1.79 g. of cyclohexanesulfamic acid in 10 ml. of ethanol. The solution is seeded and allowed to cool overnight. The crystalline colorless solid is filtered, washed with cold ethanol and ether. The product, 1-[o-(3-dimethylaminopropyl)thio]phenyl]3-methylurea, cyclohexanesulfamate, is obtained in a yield of 3.42 g.; m.p. 130°–132°.

EXAMPLE 3

1-[o-[(3-Dimethylaminopropyl]thio]phenyl]-3-methylurea, p-toluene sulfonate

A warm solution of 10.0 g. of product from Example 1 in 20 ml. of acetonitrile is treated with a warm solution of 7.2 g. of p-toluenesulfonic acid monohydrate in 20 ml. of acetonitrile. This solution gives 13.7 g. of colorless material on cooling, m.p. 106°–108°. After recrystallization from 50 ml. of acetonitrile, the colorless product, 1-[o-[3-dimethylaminopropyl]thio]phenyl]-3-methylurea, p-toluenesulfonate, weighs 12.1 g., m.p. 106°–108°.

EXAMPLE 4

1-[o-[(3-Dimethylaminopropyl)thio]phenyl]-3-methylurea, 2-naphthalenesulfonate

A mixture of 10.0 g. of product from Example 1 and 8.5 g. of 2-naphthalenesulfonic acid hydrate is dissolved in 100 ml. of warm acetonitrile and the resulting solution diluted with 80 ml. of ether to give 14.0 g. of product, m.p. 141°–143°. After recrystallization from 70 ml. of acetonitrile, the colorless product, 1-[o-[3-dimethylaminopropyl)thio]phenyl]-3-methylurea, 2-naphthalenesulfonate, weighs 12.8 g., m.p. 143°–145°.

EXAMPLE 5

1-[o-[3-Dimethylaminopropyl)thio]phenyl]-3-methylurea, p-aminobenzoate

A mixture of 10.0 g. of product from Example 1 and 5.2 g. of p-aminobenzoic acid is dissolved in 250 ml. of boiling acetonitrile, filtered and the filtrate is cooled to give 11.5 g. of colorless product, 1-[o-[(3-dimethylaminopropyl)thio]phenyl]-3-methylurea, p-aminobenzoate, m.p. 158°–160°.

EXAMPLE 6

1-[o-[(3-Dimethylaminopropyl)thio]phenyl]-3-methylurea, p-acetamidobenzoate

A mixture of 10.0 g. of product from Example 1 and 6.7 g. of p-acetamidobenzoic acid is dissolved in 750 ml. of boiling acetonitrile, filtered and the filtrate is cooled to give 13.6 g. of colorless product, 1-[o-[(3-dimethylaminopropyl)thio]phenyl]-3-methylurea, P-acetamidobenzoate, m. p. 165°–167°.

EXAMPLE 7

The following ingredients are used to prepare capsules:

| | | |
|---|---|---|
| 1-[o-[(3-dimethylaminopropyl)- thio]phenyl]-3-methylurea, p-toluenesulfonate | 250 | gm. |
| Lactose | 96.5 | gm. |
| Magnesium stearate | 3.5 | gm. |

All of the ingredients are thoroughly blended and filled into No. 2 gelatin capsules each containing 350 mg., each of which contains 250 mg. of active ingredient.

EXAMPLE 8

Gelatin capsules each containing 250 mg. of 1-[o-[(3-dimethylaminopropyl)thio]phenyl]-3-methylurea, cyclohexylsulfamate are prepared in the same manner as in Example 7 by substituting 250 gm. of the cyclohexylfulfamate for the p-toluenesulfonate in that example.

EXAMPLE 9

The following ingredients are used to make 1,000 350 mg. tablets each containing 250 mg. of active ingredient:

| | | |
|---|---|---|
| 1-[o-[(3-dimethylaminopropyl)- thio]phenyl]-3-methylurea,p- toluenesulfonate | 250 | gm. |
| Polyvinlyl pyrrolidone | 7.5 | gm. |
| Lactose | 20 | gm. |
| Magnesium stearate | 3.5 | gm. |
| Corn starch | 17.5 | gm. |
| Avicel (microcrystalline cellulose) | 51.5 | gm. |

The toluenesulfonate and lactose are thoroughly admixed. The polyvinyl pyrrolidone is dissolved in ethanol U.S.P. to make a 30 percent solution. This solution is used to granulate the mixture of toluenesulfonate and lactose. The granulation is passed through a No. 16 screen and air dried. The dried granulation is then passed through a No. 20 screen. To the screened granulation are added the magnesium stearate, Avicel and corn starch and the mixture is blended. The blend is then compressed into 350 mg. tablets on a three-eigths inch round, standard concave punch. The tablets are then veneer coated with methyl cellulose in a spray pan.

EXAMPLE 10

250 gm. of 1-[o-[(3-dimethylaminopropyl)thio]phenyl]-3-methylurea, p-toluenesulfonate is aseptically recrystallized. The sterile salt is filled into 1,000 sterile vials each containing 250 mg. of the salt and sealed with a rubber stopper. Prior to use intramuscularly or intravenously, the contents of the vial are reconstituted with 2 ml. of sterile water for injection.

EXAMPLE 11

Vials containing 250 mg. of 1-[o-[(3-dimethylaminopropyl]thio]phenyl]-3-methylurea, cyclohexanesulfamate for reconstitution are prepared in the same manner as in Example 10.

What is claimed is:

1. A composition for the relief of cardiac arrhythmias comprising about 250 to 500 mg per dosage unit of a pharmaceutically acceptable organic acid salt of 1-[o-[(3-dimethylaminopropyl)thio]phenyl]-3-methylurea and a pharmaceutically acceptable carrier therefor.

2. A composition as in claim 1 wherein the organic acid salt moiety is

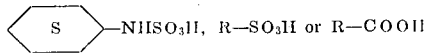

wherein R is a cyclic nucleus of the group consisting of phenyl and naphthyl.

3. A composition as in claim 2 wherein the cyclic nucleus has as a substituent a lower alkyl, amino or lower alkanoylamido group.

4. A composition as in claim 2 wherein the cyclic nucleus has as a substituent a methyl, amino or acetamido group.

5. A composition for the relief of cardiac arrhythmias comprising about 250 to 500 mg. per dosage unit of 1-[o-[3-dimethylaminopropyl)thio]phenyl]-3-methylurea cyclohexanesulfamate and a pharmaceutically acceptable carrier therefor.

6. A composition for the relief of cardiac arrhythmias comprising about 250 to 500 mg. per dosage unit of 1-[o-[3-dimethylaminopropyl)thio]phenyl]-3-methylurea p-toluenesulfonate and a pharmaceutically acceptable carrier therefor.

7. A composition for the relief of cardiac arrhythmias comprising about 250 to 500 mg. per dosage unit of 1-[o-[3-dimethylaminopropyl)thio]phenyl]-3-methylurea naphthalenesulfonate and a pharmaceutically acceptable carrier therefor.

* * * * *